(12) United States Patent
Morris et al.

(10) Patent No.: US 11,073,242 B2
(45) Date of Patent: Jul. 27, 2021

(54) CONDITIONING, COMPRESSING, AND STORING HYDROCARBON GAS FOR MOBILE, ELECTRIC POWER GENERATION

(71) Applicant: TYPHON TECHNOLOGY SOLUTIONS, LLC, The Woodlands, TX (US)

(72) Inventors: Jeffrey G. Morris, The Woodlands, TX (US); Brett Vann, Houston, TX (US)

(73) Assignee: TYPHON TECHNOLOGY SOLUTIONS, LLC, The Woodlands, TX (US)

( * ) Notice: Subject to any disclaimer, the term of this patent is extended or adjusted under 35 U.S.C. 154(b) by 96 days.

(21) Appl. No.: 16/414,216

(22) Filed: May 16, 2019

(65) Prior Publication Data
US 2019/0353303 A1   Nov. 21, 2019

Related U.S. Application Data

(60) Provisional application No. 62/672,287, filed on May 16, 2018.

(51) Int. Cl.
*E21B 43/26* (2006.01)
*F17C 5/06* (2006.01)
(Continued)

(52) U.S. Cl.
CPC ............. *F17C 5/06* (2013.01); *E21B 43/26* (2013.01); *F02B 63/04* (2013.01); *F02C 6/00* (2013.01);
(Continued)

(58) Field of Classification Search
CPC .. E21B 43/26; F17C 5/06; F02B 63/04; F02C 6/00; F04B 17/03
See application file for complete search history.

(56) References Cited

U.S. PATENT DOCUMENTS

2011/0303323 A1* 12/2011 Ding .................... B65B 1/20
141/11
2014/0262292 A1 9/2014 Joseph et al.
(Continued)

OTHER PUBLICATIONS

Int'l Search Report & Written Opinion received in copending PCT Application No. PCT/US19/32645, dated Jul. 15, 2019, 10 pages.

*Primary Examiner* — Matthew R Buck
(74) *Attorney, Agent, or Firm* — Bracewell LLP; Jwalant Dholakia; Brad Chin

(57) ABSTRACT

A system and a method for processing and storing hydrocarbon gas. A gas conditioning and compression transport comprises a gas conditioning system for processing hydrocarbon gas received from the hydrocarbon fuel source and a compression system. The compression system comprises a dual shaft electric motor capable of driving a first compressor and a second compressor to compress the hydrocarbon gas. A gas compression and storage transport receives the processed hydrocarbon gas from the gas conditioning and compression transport. The gas compression and storage transport is capable of directing a first portion of the processed hydrocarbon gas to bypass processing at the gas compression and storage transport and diverting a second portion of the processed hydrocarbon gas for storage. A storage compressor compresses the second portion of the hydrocarbon gas for storage in one or more gas storage tanks.

20 Claims, 7 Drawing Sheets

(51) Int. Cl.
*F02B 63/04* (2006.01)
*F02C 6/00* (2006.01)
*F04B 17/03* (2006.01)

(52) U.S. Cl.
CPC ........ *F04B 17/03* (2013.01); *F17C 2221/033* (2013.01); *F17C 2225/0123* (2013.01); *F17C 2227/0164* (2013.01); *F17C 2270/0171* (2013.01)

(56) References Cited

U.S. PATENT DOCUMENTS

| | | | |
|---|---|---|---|
| 2015/0129082 A1* | 5/2015 | Murphy | F17C 5/06 141/4 |
| 2015/0240996 A1* | 8/2015 | Kapoor | F17C 13/083 137/14 |
| 2017/0104389 A1* | 4/2017 | Morris | E21B 43/26 |
| 2017/0145918 A1* | 5/2017 | Oehring | F02C 7/05 |
| 2017/0218727 A1 | 8/2017 | Oehring et al. | |

\* cited by examiner

CONDITIONING, COMPRESSING, AND STORING HYDROCARBON GAS FOR MOBILE, ELECTRIC POWER GENERATION

BACKGROUND

Hydraulic fracturing has been commonly used by the oil and gas industry to stimulate production of hydrocarbon producing wells, such as oil and/or gas wells. Hydraulic fracturing, sometimes called "fracing" or "fracking" is the process of injecting fracturing fluid, which is typically a mixture of water, proppants (e.g., fracturing sand, ceramics and resin coated materials), and chemicals, into the wellbore to fracture subsurface geological formations and release hydrocarbon reserves. The fracturing fluid is pumped into a wellbore at a pressure to cause fissures within the underground geological formations. Once inside the wellbore, the pressurized fracturing fluid flows into the subsurface geological formation to fracture the underground formation. The fracturing fluid may include water, various chemical additives, and proppants that promote the extraction of hydrocarbon reserves, such as oil and/or gas. Proppants, such as fracturing sand, prevent the fissures and fractures created in the underground formation from closing, and allow the formation to remain open so that the hydrocarbon reserves are able to flow to the surface.

Implementing fracturing operations at well sites typically requires extensive investment in equipment, labor, and fuel. For instance, a typical fracturing operation uses a variety of fracturing equipment, numerous personnel to operate and maintain the fracturing equipment, relatively large amounts of fuel to power the fracturing operations, and relatively large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one or more implementations a system for processing hydrocarbon gas, comprising: a gas conditioning and compression transport that includes a gas conditioning system connected to the hydrocarbon fuel source and a compression system connected to the hydrocarbon fuel source. The compression system includes a dual shaft electric motor capable of driving a first compressor and a second compressor. The system also comprises a gas compression and storage transport coupled to the gas conditioning and compression transport.

In another implementation, a system for processing and storing hydrocarbon gas, comprising a gas conditioning and compression transport that receives hydrocarbon gas from a hydrocarbon fuel source. The gas conditioning and compression transport comprises a gas conditioning system capable of processing hydrocarbon gas received from the hydrocarbon fuel source and a compression system connected to the hydrocarbon fuel source. The compression system comprises a dual shaft electric motor capable of driving a first compressor and a second compressor to compress the hydrocarbon gas. The system also includes a gas compression and storage transport that receives processed hydrocarbon gas from the gas conditioning and compression transport. The gas compression and storage transport comprises: a manifold capable directing a first portion of the processed hydrocarbon gas to bypass processing at the gas compression and storage transport and diverting a second portion of the processed hydrocarbon gas for storage; a storage compressor that compresses the second portion of the hydrocarbon gas; and one or more gas storage tanks coupled to the compressor. The one or more gas storage tanks store the compressed second portion of the hydrocarbon gas.

In yet another implementation, a method for processing and storing hydrocarbon gas. The method comprises receiving hydrocarbon gas from a hydrocarbon fuel source located at a well site; conditioning, at the well site, the hydrocarbon gas received from the hydrocarbon fuel source; diverting, at the well site, a first portion of the processed hydrocarbon gas for storage; compressing, at the well site, the first portion of the processed hydrocarbon gas to a designated storage pressure level; storing, at the well site, the first portion of the processed hydrocarbon gas after compressing; and directing, at the well site, a second portion of the processed hydrocarbon gas to fuel a mobile, electric power generating source that powers fracturing operations.

BRIEF DESCRIPTION OF THE DRAWINGS

While certain implementations will be described in connection with the illustrative implementations shown herein, the invention is not limited to those implementations. On the contrary, all alternatives, modifications, and equivalents are included within the spirit and scope of the invention as defined by the claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

Figure 1:
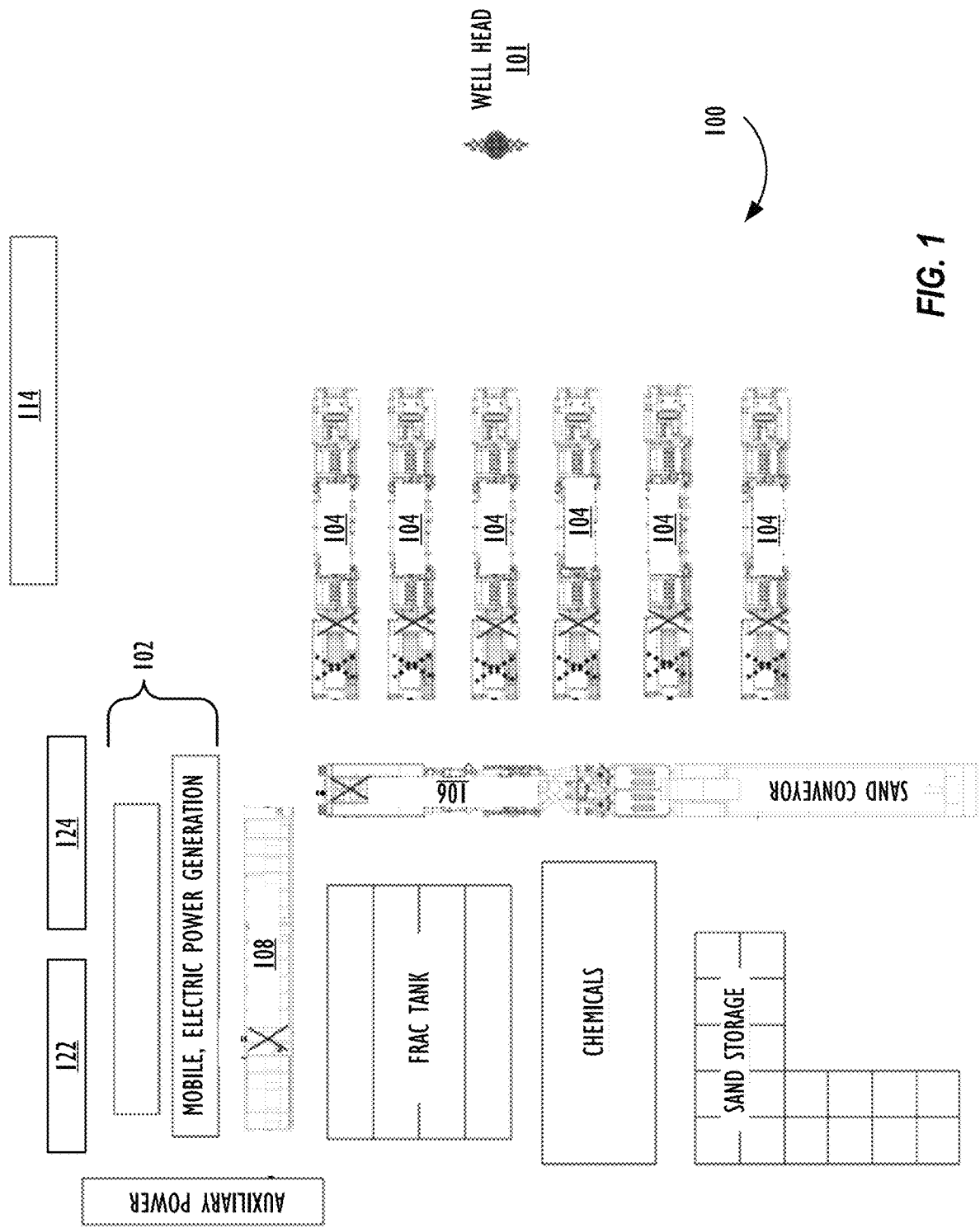
FIG. 1 is a schematic diagram of an implementation of a well site that comprises a wellhead and a mobile fracturing system.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one implementation" or to "an implementation" means that a particular feature, structure, or characteristic described in connection with the implementations is included in at least one implementation of the invention, and multiple references to "one implementation" or "an implementation" should not be understood as necessarily all referring to the same implementation.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "fracturing sand," as used within this disclosure, serves as a non-limiting example of a proppant used as a component of fracturing fluid. "Fracturing sand" is also used herein to collectively refer to both wet and dry fracturing sand. Implementations in this disclosure are not limited to fracturing sand and any other type of proppant, such as man-made ceramics, aluminum beads, resin-coated sands, and sintered bauxite, can be used with the various implementations presented in the disclosure. Unless otherwise specified within the disclosure, the term "fracturing sand" can be interchanged throughout this disclosure with the term "proppants."

As used herein, the term "transport" refers to any assembly, including, but not limited to, a trailer, truck, skid, rail car, and/or barge used to transport relatively heavy structures and/or other types of articles, such as fracturing equipment and fracturing sand. A transport could be independently movable from another transport. For example, a first transport can be mounted or connected to a motorized vehicle that independently moves the first transport while an unconnected second transport remains stationary.

As used herein, the term "trailer" refers to a transportation assembly used to transport relatively heavy structures and/or other types of articles (such as fracturing equipment and fracturing sand) that can be attached and/or detached from a transportation vehicle used to pull or tow the trailer. As an example, the transportation vehicle is able to independently move and tow a first trailer while an unconnected second trailer remains stationary. In one or more implementations, the trailer includes mounts and manifold systems to connect the trailer to other fracturing equipment within a fracturing system or fleet. As used herein, the term "lay-down trailer" refers to a trailer that includes two sections with different vertical heights. One of the sections or the upper section is positioned at or above the trailer axles and another section or the lower section is positioned at or below the trailer axles. In one implementation, the main trailer beams of the lay-down trailer may be resting on the ground when in operational mode and/or when uncoupled from a transportation vehicle, such as a tractor.

As used herein, the term "hydrocarbon gas" refers to a gas mixture that includes one or more hydrocarbon based gases and/or other types of gases. Examples of gases that could be found within the gas mixture include, but are not limited to, methane, butane, propane, ethane, ethylene, carbon dioxide, carbon monoxide, nitrogen, hydrogen sulfide, helium, and water vapor. The term "hydrocarbon gas" can be interchanged throughout this disclosure with the term "hydrocarbon gas mixture" and "natural gas."

As used herein, the term "low voltage" refers to a voltage range from about 50 volts (V) to 1,000 V for alternating current (AC) electric power. The term "medium voltage" refers to a voltage range from about 1,000 V to about 35 kilovolts (kV) for AC electric power, and the term "high voltage" refers to a voltage range greater than 35 kV for AC electric power. Although the terms "low voltage," "medium voltage," and "high voltage" generally refer voltage ranges in AC electric power, persons of ordinary skill in the art are aware that the terms are not limited to AC electric power and could correspond to direct current (DC) voltage ranges that are equivalent to the AC electric power voltage ranges. For example, the term "low voltage" could also refer to the DC voltage range from about 120 V to about 1,500 V.

Various implementations are disclosed herein that condition, compress, and store hydrocarbon gas used to fuel a mobile, electric power generation system. In one or more implementations, a gas conditioning and compression transport receives hydrocarbon gas (e.g., natural gas) from a hydrocarbon fuel source (e.g., a gas pipeline) located at or near a well site. The gas conditioning and compression transport includes a gas conditioning system that regulates hydrocarbon gas pressures, heats the hydrocarbon gas, separates out liquids from the hydrocarbon gas (e.g., water), and/or filters out unwanted contaminants (e.g., sand) from the hydrocarbon gas. The gas conditioning and compression transport also includes a compression system that utilizes a dual shaft electric motor to drive one or more compressors to compress the hydrocarbon gas to a designated pressure (e.g., about 525 pounds per square inch (PSI)). The gas conditioning and compression transport subsequently outputs the processed hydrocarbon gas to a gas compression and storage transport that siphons a portion of the processed hydrocarbon gas to fill one or more gas storage tanks. Prior to storing the processed hydrocarbon gas within the gas storage tanks, the gas compression and storage transport further compresses the hydrocarbon gas to a relatively higher pressure level (e.g., about 3,000 PSI or 3,600 PSI). The remaining portion of the processed hydrocarbon gas bypasses any additional processing by the gas conditioning and compression transport and directly outputs to the mobile, electric power generation system. When the pressure of the hydrocarbon gas received by the gas compression and storage transport from the gas conditioning and compression transport starts to drop below a predetermined backup pressure (e.g., about 500 PSI), the gas compression and storage transport releases the stored hydrocarbon gas within the gas storage tanks to output to the mobile, electric power generation system.

FIG. 1 is a schematic diagram of an implementation of a well site that comprises a wellhead 101 and a mobile fracturing system 100. Generally, a mobile fracturing system 100 may perform fracturing operations to complete a well and/or transform a drilled well into a production well. For example, the well site may be a site where operators are in the process of drilling and completing a well. Operators may start the well completion process with vertical drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently pack the rig and move a mobile fracturing system 100 onto the well site to perform fracturing operations that force relatively high pressure fracturing fluid through wellhead 101 into subsurface geological formations to create fissures and cracks within the rock. The mobile fracturing system 100 may then be moved off the well site once the operators complete fracturing operations. Typically, fracturing operations for well site may last several days.

FIG. 1 illustrates that the mobile fracturing system 100 includes multiple fracturing pump transports 104 and a hydration-blender transport 106. A switch gear transport 108 directly provides the hydration-blender transport 106 and the fracturing pump transport 104 electric power at a relatively higher-medium voltage level (e.g., 13.8 kilovolts (kV)). The drives (e.g., variable frequency drives (VFDs)) to control and monitor the prime movers for the different transports 104 and 106 and transformers for stepping down voltage levels are mounted on the fracturing pump transport 104 and the hydration-blender transport 106. For example, each of the fracturing pump transports 104 have a transformer that steps down the input voltage (e.g., 13.8 kV) to one or more different voltages (e.g., 4.2 kV, 600 volts (V), 480 V). The hydration-blender transport 106 may also have its own transformer to step down the input voltage to one or more voltage levels. The hydration-blender transport 106 may also provide electric power at the stepped down to one or more lower voltage levels (e.g., 4.2 kV, 600 V, 480 V) to other downstream fracturing equipment, such as a sand conveyor.

In FIG. 1, the mobile fracturing system 100 includes a mobile, electric power generation system 102 configured to generate electricity to supply to the fracturing pump transport 104, the hydration-blender transport 106, data van 114, and/or other fracturing equipment at the well site. FIG. 1 illustrates that the mobile, electric power generation system 102 is a centralized power generation system that distributes power to most or all of the fracturing equipment within the mobile fracturing system 100. As an example, the mobile, electric power generation system 102 is able to produce electric power in the ranges of about 15-40 megawatts (MW) to perform hydraulic fracturing operations at a well site with one or more wells. In one or more implementations, the mobile, electric power generation system 102 includes a turbine-electric generator transport that compresses and mixes combustion air with hydrocarbon gas to spin and generate mechanical energy and then converts the mechanical energy to electricity. The mobile, electric power generation system 102 also includes an inlet and exhaust transport that provides ventilation and combustion air to the turbine-electric generator transport when generating electricity. Configuring and utilizing a turbine-electric generator transport and an inlet and exhaust transport are discussed and shown in more detail in U.S. Pat. No. 9,534,473, filed Dec. 16, 2015 by Jeffrey G. Morris et al. and entitled "Mobile Electric Power Generation for Hydration Fracturing of Subsurface Geological Formations," which is hereby incorporated by reference as if reproduced in its entirety. In other implementations, rather than employing a centralized power generation system, the mobile, electric power generation system 102 may utilize a distributed power system, where one or more of the fracturing equipment is powered by one or more independent and separate power generation sources. For example, each of the fracturing pump transports 104 could be connected to and/or mounted with a separate power generation source, such as a gas turbine and generator combination configured to produce about 1-8 MW of electric power.

To generate electric power, the mobile, electric power generation system 102 converts hydrocarbon gas (e.g., natural gas) obtained from one or more onsite hydrocarbon fuel sources, a remote offsite location, and/or another location near the mobile, electric power generation system 102. In one or more implementations, the onsite hydrocarbon fuel source is a hydrocarbon gas line located at the well site. The hydrocarbon gas line contains hydrocarbon gas from one or more producing wellheads and/or pipelines, where the hydrocarbon gas may be unprocessed or partially processed prior to reaching the mobile, electric power generation system 102. The degree of processing of the supplied hydrocarbon gas varies depending on where in the processing stage the hydrocarbon gas line is part of in terms of transforming the hydrocarbon gas to a marketable gas mixture (e.g., natural gas). For example, the hydrocarbon gas line can be part of the gathering and sales pipeline that has already processed the hydrocarbon gas with a variety of treating equipment, such as production separators, line heaters, and/or gas dehydrators prior to reaching the mobile, electric power generation system 102. In another example, the hydrocarbon gas line may be part of the wellhead flowline that carries unprocessed hydrocarbon gas that contain not only the useable hydrocarbon gas, but also water, sand, and other containments.

As shown in FIG. 1, the mobile fracturing system 100 includes a gas conditioning and compression transport 122 to treat the hydrocarbon gas supplied from the onsite hydrocarbon fuel sources. Specifically, the gas conditioning and compression transport 122 processes and pressurizes the hydrocarbon gas into a state that the mobile, electric power generation system 102 is able to use as a fuel source. As an example, the gas conditioning and compression transport 122 could perform process operations that include, but are not limited to, regulating hydrocarbon gas pressures, heating the hydrocarbon gas, separating out liquids from the hydrocarbon gas, filtering out unwanted contaminants (e.g., sand) from the hydrocarbon gas, and/or compressing the hydrocarbon gas. The gas conditioning and compression transport 122 can also compress the hydrocarbon gas to a designated pressure level (e.g., about 525 PSI) for the mobile, electric power generation system 102 to use as a fuel source. The designated pressure level produced by the gas conditioning and compression transport 122 corresponds to a pressure level that is within a range of pressure levels that the mobile, electric power generation system 102 can safely process and convert into electricity. After conditioning and/or pressurizing the hydrocarbon gas, the gas conditioning and compression transport 122 outputs the treated hydrocarbon gas to the gas compression and storage transport 124.

The incoming pressure levels for the hydrocarbon gas that the onsite hydrocarbon fuel sources supply to the gas conditioning and compression transport 122 may vary. As an example, a hydrocarbon gas line may supply hydrocarbon gas at pressures as low as about 15 PSI to pressures at about 1,900 PSI. To output the hydrocarbon gas at a designated pressure level (e.g., about 525 PSI), the gas conditioning and compression transport 122 may include a compression system that compresses hydrocarbon gas to the designated pressure level when the incoming pressure for the supplied hydrocarbon gas is relatively low. For example, the incoming pressure level that the onsite hydrocarbon fuel source supplies could be about 100 PSI. The compression system subsequently compresses the hydrocarbon gas to the designated pressure level of about 525 PSI. For instances where the incoming pressure level that the onsite hydrocarbon fuel source supplies is greater than the designated pressure level (e.g., 1,000 PSI), the gas conditioning and compression transport 122 does not compress the hydrocarbon gas the gas conditioning system. Instead, gas conditioning and compression transport 122 could regulate the hydrocarbon gas to the designated pressure level.

In one or more implementations, because of mobility restrictions, the gas conditioning and compression transport 122 could be a trailer with limited width, length, and height dimensions. As an example, to comply with certain roadway restrictions, the trailer may have a maximum width of about 8 feet and 6 inches and a maximum length of about 59 feet. The compression system and gas conditioning system mounted on the trailer could have a height of less than about 13 feet and 6 inches. Based on the trailer dimensions, the amount of trailer space to mount the compression system may be limited. To maintain mobility while sustaining a certain compression capability, the gas conditioning and compression transport 122 includes a compression system that utilizes a dual shaft electric motor to drive one or more compressors. The dual shaft electric motor configuration not only reduces the amount of space on the trailer when compared to a hydrocarbon powered motor (e.g., diesel or natural gas engine) that drives one or more pumps, but also provides enough power to compress a given amount of hydrocarbon gas to a designated pressure level. In one or more implementations, the dual shaft electric motor is able to drive a screw compressor and a reciprocating compressor. In other implementations, the dual shaft electric motor drives two different screw compressors. Further, the gas conditioning and compression transport 122 may mount the gas conditioning system and compression system on a laydown trailer with at least three axles used to support and distribute the weight. Other implementations of the gas conditioning and compression transport 122 may be trailers that exceed three axles depending on the total transport weight. The dimensions and the number of axles may be adjusted to allow for the transport over roadways that typically mandate certain height, length, and weight restrictions.

The gas compression and storage transport 124 acts as a fuel backup system that supplies processed hydrocarbon gas to the mobile, electric power generation system 102. The gas compression and storage transport 124 is separate and independently movable from the gas conditioning and compression transport 122. In some situations, the onsite hydrocarbon fuel sources and/or the gas conditioning and compression transport 122 are unable to provide enough fuel to the mobile, electric power generation system 102. For example, the onsite hydrocarbon fuel source could be experiencing a shortage of hydrocarbon gas and/or the gas conditioning and compression transport 122 could be malfunctioning. In either of these situations, the mobile, electric power generation system 102 may not receive enough hydrocarbon gas to provide power for its current load. To provide the operator additional time to resolve failure issues, the gas compression and storage transport 124 temporarily provides conditioned and compressed hydrocarbon gas to the mobile, electric power generation system 102. When a hydrocarbon gas shortage occurs, the pressure of the hydrocarbon gas that the gas compression and storage transport 124 receives starts to drop. If the pressure of the hydrocarbon gas drops below a predetermined backup pressure (e.g., about 500 PSI), the gas compression and storage transport 124 releases and transfers the stored hydrocarbon gas to the mobile, electric power generation system 102.

A manifold within the gas compression and storage transport 124 is able to route the processed hydrocarbon gas received from the gas conditioning and compression transport 122 into multiple gas flows. The manifold is able to divert a relatively small portion of the processed hydrocarbon gas to fill one or more gas storage tanks. Prior to storing the processed hydrocarbon gas within the gas storage tanks, the gas compression and storage transport 124 further compresses the hydrocarbon gas to a designated storage pressure level. The designated storage pressure level (e.g., a pressure level ranging from about 3,000 PSI to 3,600 PSI) represents a pressure level that exceeds the pressure level the mobile, electric power generation system 102 can safely process and convert the hydrocarbon gas into electric power. By compressing the hydrocarbon gas to a higher designated pressure level, the gas storage tanks are able to store and hold larger amounts of the processed hydrocarbon gas. For gas flows that are not routed to the storage tanks, the manifold bypasses processing at the gas compression and storage transport 124 and directly outputs the processed hydrocarbon gas to the mobile, electric power generation system for generating electricity.

Although FIG. 1 illustrates a specific implementation of mobile fracturing system 100 that includes gas conditioning and compression transport 122 and a gas compression and storage transport 124, the disclosure is not limited to the specific implementation illustrated in FIG. 1. For instance, rather than include a single hydration-blender transport 106, the mobile fracturing system 100 may employ a hydration unit separate and independent from a blender transport. Additionally or alternatively, the fracturing pump transport 104 and hydration-blender transport 106 may not have transformers and/or one or more drives (e.g., variable frequency drives (VFDs)) mounted on the transport. Instead, the mobile fracturing system 100 may have separate and independent transports that house the transformers and/or drives. Also, even though FIG. 1 illustrates that the gas conditioning and compression transport 122 and a gas compression and storage transport 124 are located at the well site, other implementations could have the two transports located offsite. The use and discussion of FIG. 1 is only an example to facilitate ease of description and explanation.

Figure 2:
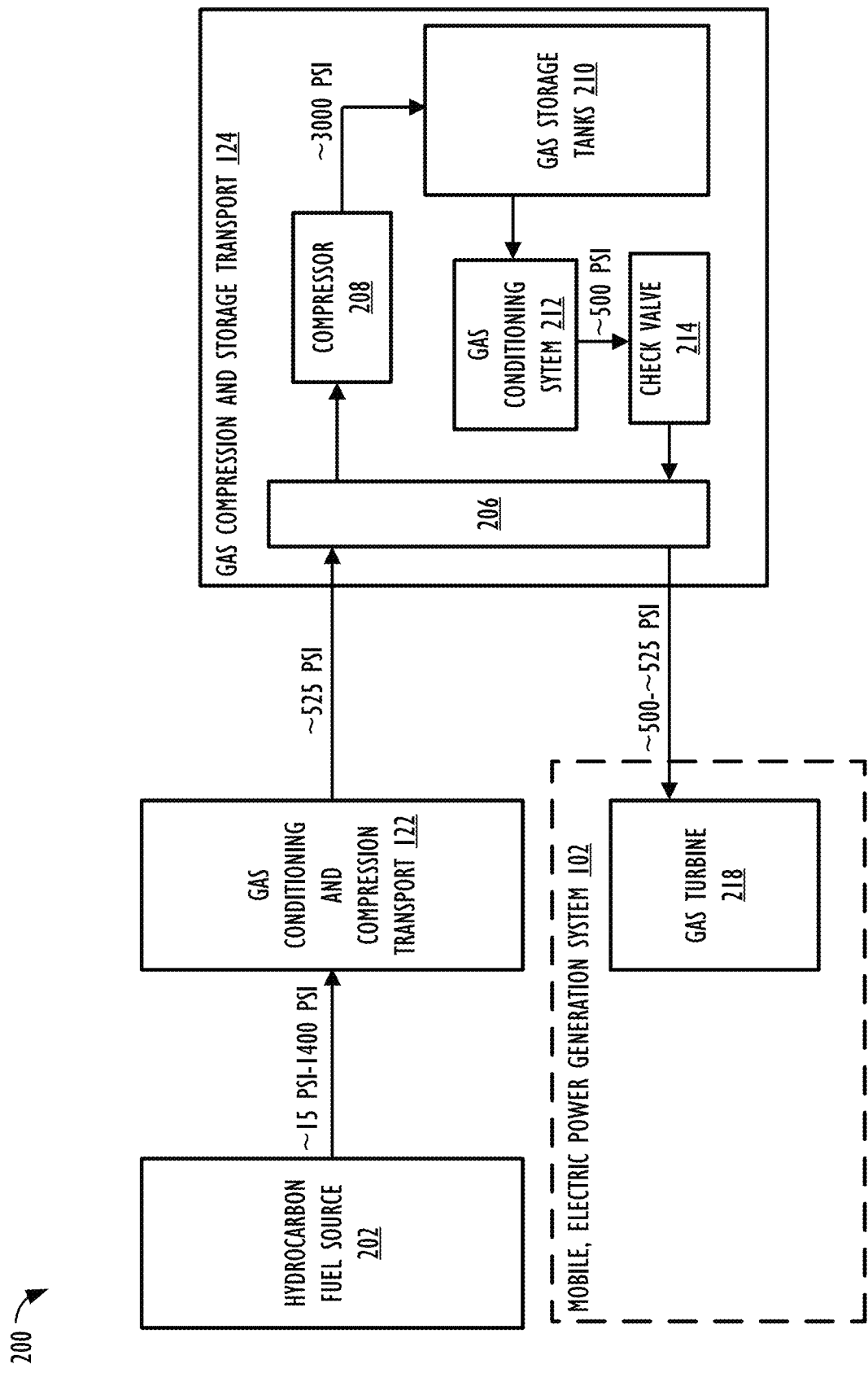
FIG. 2 is a block diagram of a gas flow path that supplies hydrocarbon gas to a gas turbine within a mobile, electric power generation system.

FIG. 2 is a block diagram of a gas flow path 200 that supplies hydrocarbon gas to a gas turbine 218 within a mobile, electric power generation system 102. The gas flow path 200 starts with a hydrocarbon fuel source 202 supplying hydrocarbon gas to a gas conditioning and compression transport 122. In one or more implementations, the hydrocarbon fuel source 202 is an onsite hydrocarbon gas line that supplies unprocessed and/or partially processed hydrocarbon field gas from a producing wellhead. In other implementations, the hydrocarbon fuel source 202 is located offsite and/or at a remote location. The hydrocarbon fuel source 202 supplies the hydrocarbon gas to a gas conditioning and compression transport 122 at pressures ranging from about 15 PSI to about 1,900 PSI. The gas conditioning and compression transport 122 treats the received hydrocarbon gas to generate a processed hydrocarbon gas that the mobile, electric power generation system 102 is able to use as fuel for power conversion. The gas conditioning and compression transport 122 is discussed in more detail with reference to FIGS. 3 and 5.

In FIG. 2, the gas conditioning and compression transport 122 directs the processed hydrocarbon gas to the gas compression and storage transport 124 at a designated pressure of about 525 PSI. The designated pressure level for the outputted hydrocarbon gas could be set to other pressure levels depending on the design of gas turbine 218. As an example, the General Electric® 2500 gas turbine may utilize hydrocarbon gas at pressures ranging from about 500 PSI to about 550 PSI. Other gas turbines may utilize hydrocarbon gas at varying pressure levels, for example, about 150 PSI to about 400 PSI. The gas compression and storage transport 124 receives the conditioned and pressurized hydrocarbon gas at manifold 206, which then routes the hydrocarbon gas into multiple gas flows. The manifold 206 diverts one gas flow, which includes a relatively small portion of the processed hydrocarbon gas, to compressor 208 to compress the hydrocarbon gas for storage. The manifold 206 directs another gas flow to bypass any processing at the gas compression and storage transport 124 and outputs the processed hydrocarbon gas directly to the mobile, electric power generation system 102. The gas compression and storage transport 124 is discussed in more detail with reference to FIGS. 4 and 6.

The compressor 208 compresses the received hydrocarbon gas to a designated storage pressure. In one or more implementations, the compressor 208 may be powered by electricity from a power source, such as a transformer mounted on gas compression and storage transport 124, a switch gear transport, the gas conditioning and compression transport 122, and/or any other transport that is part of a mobile fracturing system. For example, the compressor 208 may receive electric power via a 480 V or 4.2 kV line from the gas conditioning and compression transport 122. In another example, the compressor 208 may receive power from a mounted transformer that receives electric power via 13.8 kV line from the switch gear transport. Alternatively, the compressor 208 may be powered by a motor that utilizes hydrocarbon fuel, such as a diesel engine and/or natural gas engine.

The compressor 208 outputs the relatively high pressured hydrocarbon gas to gas storage tanks 210. FIG. 2 illustrates that the designated storage pressure can be pressurized to a pressure level ranging from about 3,000 PSI to 3,600 PSI. Other implementations of the gas compression and storage transport 124 can be compressed to other storage pressure levels (e.g., pressure levels ranging from about 2,800 PSI to 3,000 PSI). The amount of gas storage tanks 210 and the designated storage pressure can vary depending on the anticipated amount of time an operator may need the gas compression and storage transport 124 to supply hydrocarbon gas while resolving any problems that occur at the hydrocarbon fuel source 202 and/or gas conditioning and compression transport 122.

When a problem occurs at the hydrocarbon fuel source 202 and/or gas conditioning and compression transport 122, the pressure of the hydrocarbon gas that the gas compression and storage transport 124 receives starts to drop. In FIG. 2, if the pressure of the hydrocarbon gas drops below a predetermined backup pressure of about 500 PSI, the gas compression and storage transport 124 release and transfers hydrocarbon gas stored in gas storage tanks 210 to manifold 206. Prior to reaching the manifold 206, the gas conditioning system 212 processes the stored hydrocarbon gas, such as heating the stored hydrocarbon gas and regulating the stored hydrocarbon gas down to the predetermined backup pressure of about 500 PSI. The check valve 214 allows gas flow in a single direction. Using FIG. 2 as an example, the check valve 214 allows the stored hydrocarbon gas to flow from the gas conditioning system 212 to the manifold 206. The check valve 214 prevents the hydrocarbon gas to flow from manifold 206 to the gas conditioning system 212. The gas compression and storage transport 124 continues to supply gas to manifold 206 until the pressure of the hydrocarbon gas that the gas compression and storage transport 124 receives exceeds the predetermined backup pressure of about 500 PSI.

FIG. 2 illustrates that the processed hydrocarbon gas outputted from the gas compression and storage transport 124 is sent to the mobile, electric power generation system 102. As discussed above, in one or more implementations, the mobile, electric power generation system 102 may be a centralized electric power system. Alternatively, in other implementations, the mobile, electric power generation system 102 may be a distributed electric power system that includes multiple generators that independently connect to other fracturing equipment. As shown in FIG. 2, the mobile, electric power generation system 102 includes at least one gas turbine 218 that receives processed hydrocarbon gas from manifold 206 at the designated pressure of about 525 PSI. When the gas compression and storage transport 124 provides the hydrocarbon gas from gas storage tanks 210, the gas turbine 218 may receive hydrocarbon gas from manifold 206 at the predetermined backup pressure of about 500 PSI.

Figure 3:
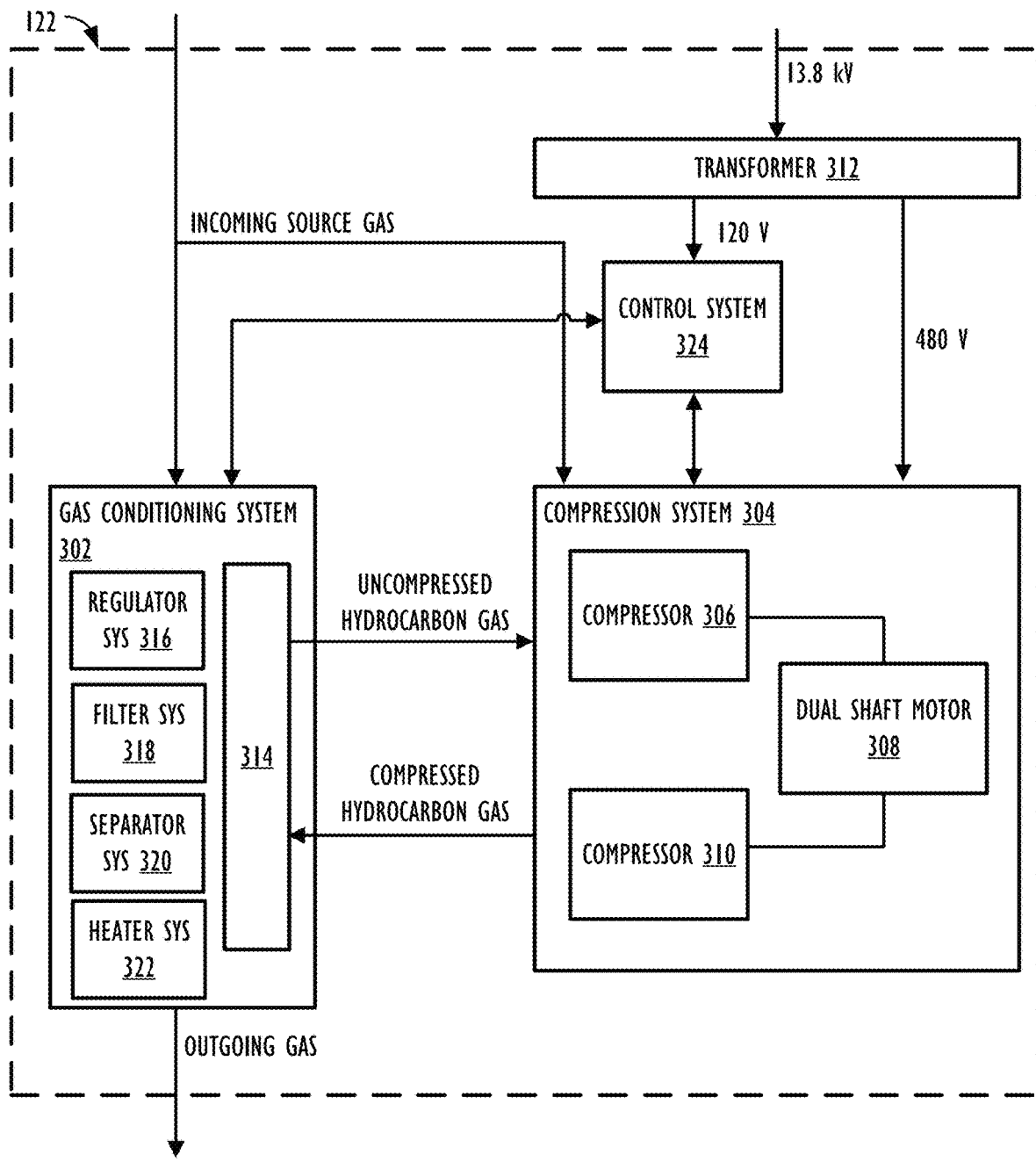
FIG. 3 is a block diagram of the gas conditioning and compression transport for supplying hydrocarbon gas to a mobile, electric power generation system.

FIG. 3 is a block diagram of the gas conditioning and compression transport 122 for supplying hydrocarbon gas to a mobile, electric power generation system. The gas conditioning and compression transport 122 includes a gas conditioning system 302 that processes incoming source gas from a hydrocarbon fuel source. FIG. 3 depicts that the gas conditioning system 302 could include a manifold system 314, a regulator system 316, a filter system 318, a separator system 320, and/or a heater system 322, all of which are well-known in the art, to process the incoming source gas. For example, the regulator system 316 includes one or more regulators (e.g., a regulator skid) that produce a pressure drop for the incoming source gas before the hydrocarbon gas leaves the gas compression and storage transport 124. The regulators may positioned at one or more sections of a gas flow path and may lower the pressure to one or more different pressure levels. The filter system 318 and separator system 320 include one or more units that collect water, condensate, sand, and/or other fluid and/or solid particles. As persons of ordinary in the art are aware, one or more units within the filter system 318 and/or separator system 320 may process the incoming source gas prior to be sent to the compression system 304 or after compression system 304 compresses the hydrocarbon gas. The heater system 322 heats up hydrocarbon gas that has been regulated down to a lower pressure. In one or more implementations, the heater system 322 is an electric heater that offsets temperature drops caused from regulating the pressure levels of the hydrocarbon gas.

FIG. 3 illustrates that the gas conditioning and compression transport 122 can also include a compression system 304 that compresses the hydrocarbon gas to a designated pressure level. Rather than having the compression system 304 be separate and located on a different transport than the gas conditioning system 302, the compression system 304 and the gas conditioning system 302 are mounted on the same transport and are interconnected together using a manifold system 314. To improve mobility, maintain a certain compression capability, and reduce footprint size, the compression system 304 includes a dual shaft electric motor 308 that drives compressors 306 and 310. The dual shaft electric motor configuration reduces the amount of space occupied on the transport as opposed to a hydrocarbon fueled engine that drives a single compressor (e.g., a reciprocating compressor). In one or more implementations, the dual shaft electric motor 308 drives a screw compressor (e.g., compressor 306) and a reciprocating compressor (e.g., compressor 310) that are relatively smaller in size. In other implementations, the dual shaft electric motor drives two different screw compressors (compressors 306 and 310).

The compression system 304 may receive electric power to drive the dual shaft electric motor 308 and the control system 324. The gas conditioning and compression transport 122 includes a transformer 312 that receives a relatively high medium voltage of 13.8 kV and steps down to relatively lower medium voltage or low voltage level (e.g., about 4.2 kV, 600 V, 480 V, 240 V, and/or 120 V). The stepped down voltages then powers the dual shaft electric motor 308 to drive compressors 306 and 310 and the control system 324 used to control and manage the gas conditioning system 302 and compression system 304. In FIG. 3, transformer 312 provides a 480 V line to power compression system 304 and a 120 V line to power control system 324. In other implementations, transformer 312 could provide other voltage levels, such as a 600 V or a 4.2 kV line, to power compression system 304. Additionally or alternatively, transformer 312 may supply a 240 V voltage line to power control system 324.

The control system 324 shown in FIG. 3 could include one or more programmable controllers that utilize sensor information to manage control valves for the gas conditioning system 302. Additionally, the control system 324 could include VFDs, other drives, and/or other instrumentation that monitor, record data, and/or control power to the dual shaft electric motor 308 and/or compressors 306 and 310. The control system 324 utilizes the programmable controllers and drives to automate gas conditioning and compression while relaying data about the process to a user interface viewable by an operator. The control system 324 may also be connected to a data van and/or other fracturing equipment using a communication network (e.g., a local area network).

Figure 4:
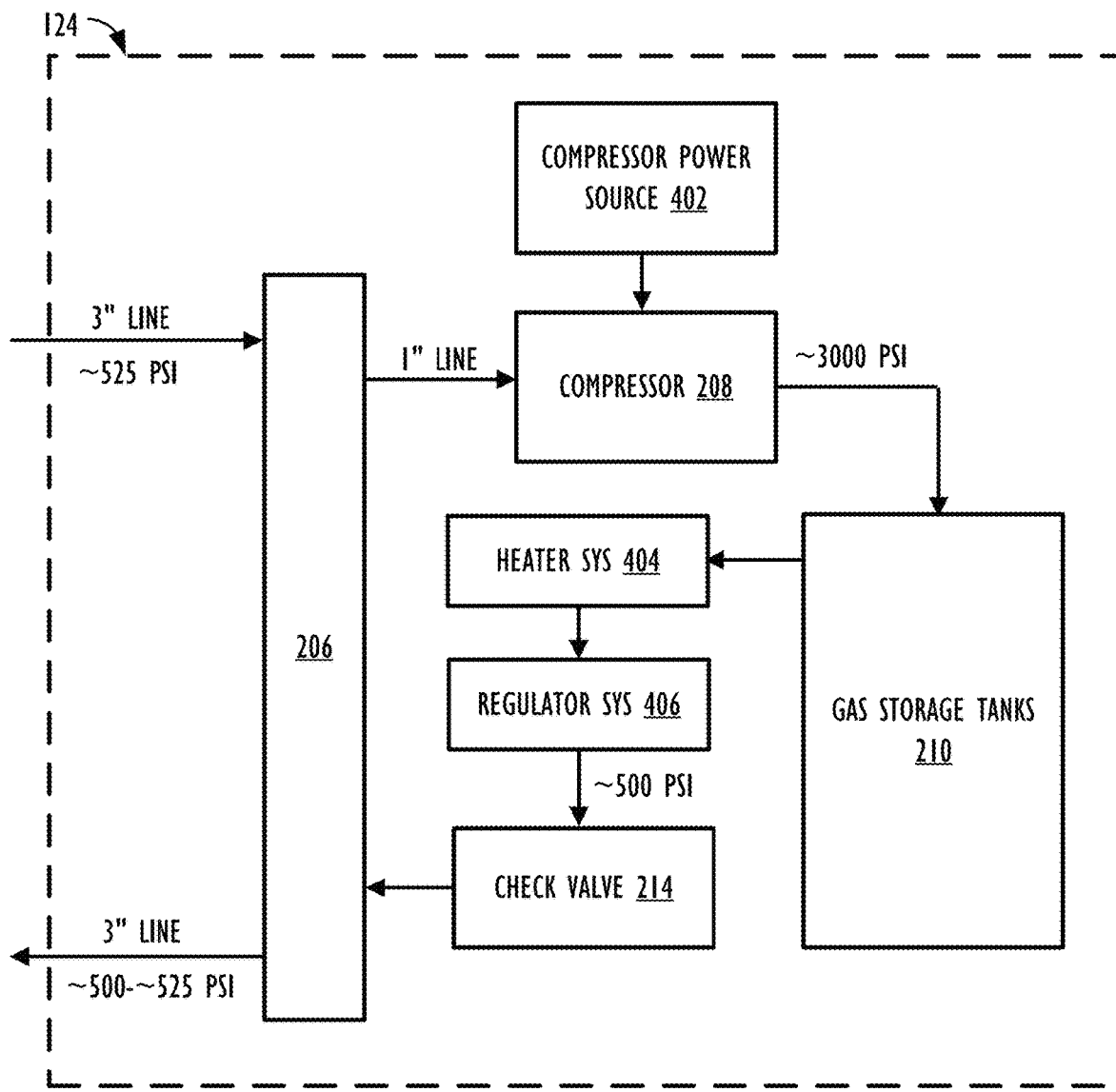
FIG. 4 is a block diagram of the gas compression and storage transport for storing and temporarily supplying hydrocarbon gas to a mobile, electric power generation system.

FIG. 4 is a block diagram of the gas compression and storage transport 124 for storing and temporarily supplying hydrocarbon gas to a mobile, electric power generation system. FIG. 4 depicts that manifold 206 receives conditioned and pressurized hydrocarbon gas via the three inch line. In other implementations, manifold 206 may be configured to receive the processed hydrocarbon gas using other line sizes (e.g., about a four inch line). The manifold 206 diverts a relatively small portion of the processed hydrocarbon gas to a relatively smaller line (e.g., about a one inch line) connected to compressor 208. In FIG. 4, the compressor 208 further compresses the hydrocarbon gas received via the one inch line to a designated storage pressure that ranges from about 3,000 PSI to about 3,600 PSI. The manifold 206 directs the remaining portion of the hydrocarbon gas out of the gas compression and storage transport 124 via a second three inch line. FIG. 4 illustrates that a heater system 404 (e.g., a line heater) and regulator system 406 can condition the stored hydrocarbon gas prior to being routed to the manifold 206. In particular, the regulator system 406 drops the pressure of the hydrocarbon gas from the designated storage pressure of about 3,000 PSI to a predetermined backup pressure of about 500 PSI. The heater system 404 heats up the hydrocarbon gas to offset the decrease in temperature of the hydrocarbon gas when the regulator system 406 drops the pressure level.

In one or more implementations, the compressor power source 402 corresponds to electric power received from a power source, such as transformer mounted on the gas compression and storage transport 124, the mobile, electric power generation system, the gas conditioning and compression transport and/or other transports. For example, the compressor power source 402 may provide alternating current (AC) power at one or more voltage levels, such as 120 V, 240 V, 480 V, 600 V, and/or 4.2 kV). The design and type of compressor 208 may determine the voltage level that the compressor power source 402 supplies. The compressor power source 402 could also include other sources of electric power, such as solar power. Alternatively, the compressor power source 402 may utilize hydrocarbon gas and/or other types of hydrocarbon fuel (e.g., natural gas, gasoline, or diesel) to power the compressor 208. As an example, the compressor power source 402 may contain a battery starter that starts a natural gas engine to power compressor 208.

Figure 5:
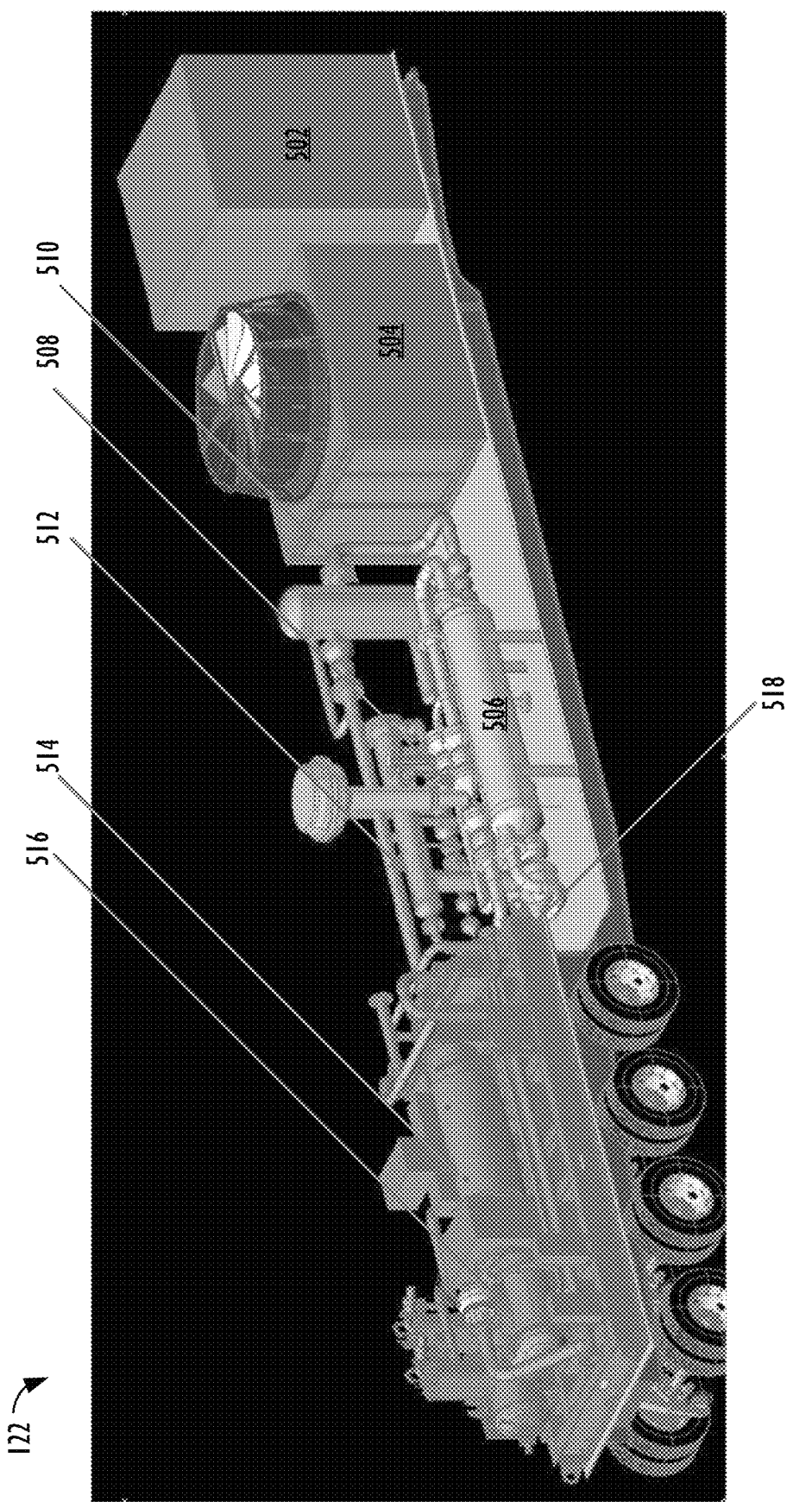
FIG. 5 is a profile view of an implementation of the gas conditioning and compression transport.

FIG. 5 is a profile view of an implementation of the gas conditioning and compression transport 122. As shown in FIG. 5, the gas conditioning and compression transport 122 is a trailer that mounts a gas conditioning system that interconnects to a gas compression system. In FIG. 5, the gas conditioning system includes an inlet knock out drum 506, an inlet scrubber 508, a heater 510, and discharge filter 512. The inlet knock out drum 506 acts as a vapor-liquid separator that removes water droplet from the hydrocarbon gas supplied by a hydrocarbon fuel source. The inlet scrubber 508 acts a separator that is able to remove solid particles and liquid particles liquids from the hydrocarbon gas flow. The inlet knock out drum 506 and an inlet scrubber 508 may arranged within the gas path flow to treat the hydrocarbon gas prior to compression. The discharge filter 512 may filter the hydrocarbon gas from solid and/or filter particles after compressing the hydrocarbon gas. In instances when the supplied hydrocarbon gas is regulated to a lower pressure level, the heater 510 may heat the hydrocarbon gas to offset decreases in temperature.

The gas compression system includes a dual shaft electric motor 514 that drives compressors 516 and 518 to compress the hydrocarbon gas. FIG. 5 also illustrates that a cooler system 504 and control and power system 502 is mounted on the gas conditioning and compression transport 122 to support compression of the hydrocarbon gas. The cooler system 504 cools and dissipates heat for lubrication supplied to the compressors 516 and 518. In one or more implementations, the cooler system 504 is also able to cool and dissipate heat for compressed hydrocarbon gas. Typically, when a gas compression system compresses hydrocarbon gas, the compression process may heat up the hydrocarbon gas to an undesired temperature. The cooler system 504 cools the hydrocarbon back down to a desired or target temperature. The controls and power system 502 may include a transformer that supplies electric power to the dual shaft electric motor 514 and one or more drives (e.g., VFD) that control the dual shaft electric motor and/or other components found on the gas conditioning and compression transport 122.

Figure 6:
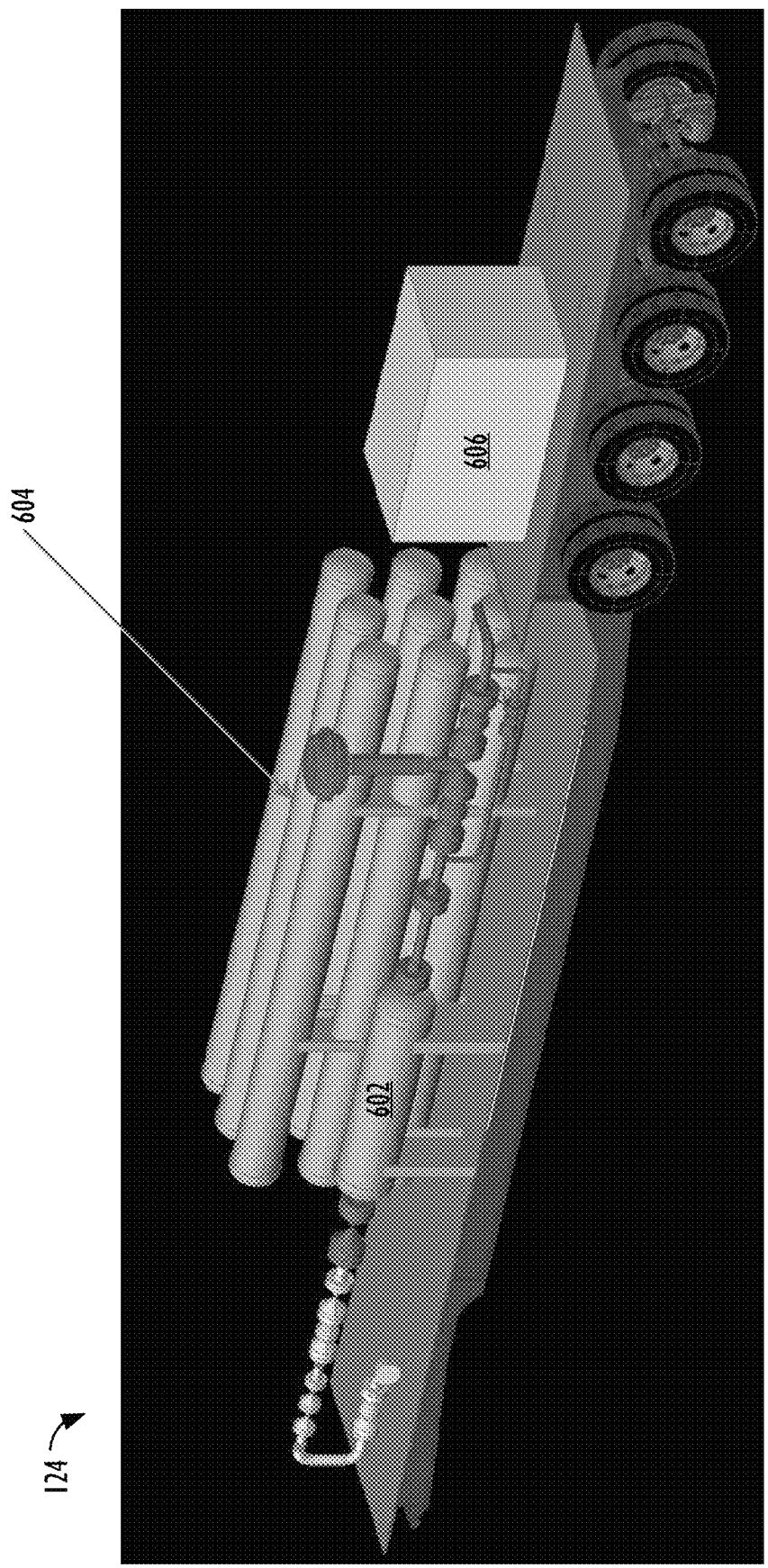
FIG. 6 is a profile view of an implementation of the gas compression and storage transport.

FIG. 6 is a profile view of an implementation of the gas compression and storage transport 124. As shown in FIG. 6, the gas compression and storage transport 124 includes a plurality of gas storage tanks 604 used to store compressed gas. The gas compression and storage transport 124 utilizes compressor system 606 to compress a designated storage pressure to store within the gas storage tanks 604. As previously discussed, heater 602 may offset the decrease in temperature caused from regulating the hydrocarbon gas to a relatively lower pressure level. Although not explicitly shown in FIG. 6, the gas compression and storage transport 124 can include a manifold to divert a relatively small portion of incoming hydrocarbon gas to gas storage tanks 604 and one or more regulators to drop the pressure (e.g., a pressure level from about 3,000 PSI to 3,600 PSI) for the stored hydrocarbon gas to a predetermined backup pressure (e.g., about 500 PSI).

Although FIGS. 3 and 5 illustrate a specific implementation of a gas conditioning and compression transport 122, and FIGS. 4 and 6 illustrate a specific implementation of a gas compression and storage transport 124 the disclosure is not limited to the specific implementations illustrated in FIGS. 3-6. For instance, the gas conditioning and compression transport 122 and a gas compression and storage transport 124 can include a variety of other components not explicitly shown, but are known in the art. As an example, the gas conditioning and compression transport 122 could include interconnecting piping and instrumentation equipment not explicitly shown in FIGS. 3-6. The use and discussion of FIGS. 3-6 are only examples to facilitate ease of description and explanation.

Figure 7:
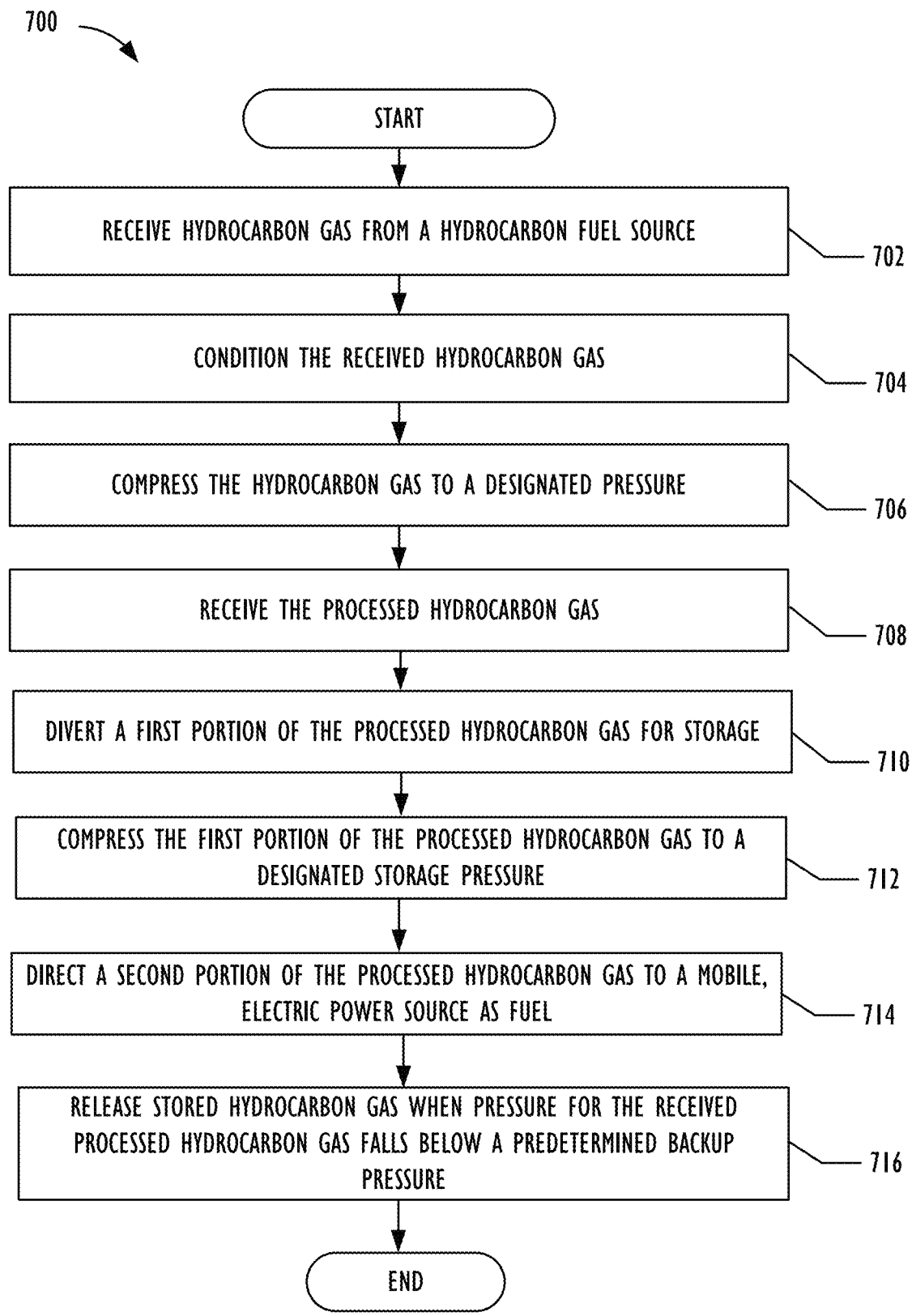
FIG. 7 is a flow chart of an implementation of a method that conditions, compresses, and stores hydrocarbon gas for a mobile, electric power generation system.

FIG. 7 is a flow chart of an implementation of a method 700 that conditions, compresses, and stores hydrocarbon gas for a mobile, electric power generation system. Using FIGS. 1-6 as examples, method 700 can be implemented using the gas conditioning and compression transport 122 and gas compression and storage transport 124. In one or more implementations, method 700 can be utilized for an onsite hydrocarbon fuel source that supplies unprocessed and/or partially processed hydrocarbon gas. Although FIG. 7 illustrates that the blocks of method 700 are implemented in a sequential operation, method 700 is not limited to this order of operations, and instead other implementations of method 700 may have one or more blocks implemented in parallel operations. For example, blocks 710 and 714 can be implemented sequentially or in parallel.

Method 700 starts at block 702 and receives hydrocarbon gas from a hydrocarbon fuel source. Afterwards, method 700 moves to block 704 and conditions the received hydrocarbon gas. Recall that conditioning the hydrocarbon gas could include, separating and filtering out containments, heating the hydrocarbon gas, and/or regulating the hydrocarbon gas. Method 700 may then move to block 706 and compress the hydrocarbon gas to a designated pressure. In one or more implementations, the designated pressure at block 706 corresponds to a pressure level that falls within an operation range of a gas turbine (e.g., about 500 to 550 PSI). Method 700 may also utilize a dual shaft electric motor to drive one or more compressors to compress the hydrocarbon gas.

Method 700 then continues to block 708 and receives the processed hydrocarbon gas. At block 710, method 700 is able to divert a first portion of the processed hydrocarbon gas for storage. Method 700 compresses the first portion of the processed hydrocarbon gas to a designated storage pressure at block 712. The designated storage pressure is at a relatively higher pressure than the designated pressure. The designated storage pressure can depend on the amount of hydrocarbon gas an operator desires to store and/or the integrity of the gas storage containers. Method 700 proceeds to block 714 and directs a second portion of the processed hydrocarbon gas to a mobile, electric power generating source as fuel. The second portion of the processed hydrocarbon gas may bypass any processing used to store the hydrocarbon gas.

Method 700 may then proceed to block 716 and release stored hydrocarbon gas when pressure for the received processed hydrocarbon gas falls below a predetermined backup pressure. As discussed with reference to FIG. 4, stored hydrocarbon gas can be regulated down from the designated storage pressure (e.g., about 3,000 or 3,600 PSI) to a predetermined backup pressure (e.g., about 500 PSI). The hydrocarbon can also be heated to offset temperature drops caused from regulating the stored hydrocarbon gas. When the pressure of the received hydrocarbon gas falls below the predetermined backup pressure, method 700 starts to supplement the hydrocarbon gas flow to the mobile, electric power generating source using the stored hydrocarbon gas. In certain instances, the stored hydrocarbon gas may partially supplement the hydrocarbon gas flow to the mobile, electric power generating source. In other instances, the entire hydrocarbon gas flow directed to the mobile, electric power generating source is from the stored hydrocarbon gas.

At least one implementation is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are implementation(s) of the present disclosure.

While several implementations have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

What is claimed is:

1. A system for processing and storing hydrocarbon gas, the system comprising:
  a first transport including:
    a gas conditioning system that receives hydrocarbon gas from an external source, and that includes a processing unit which processes the received hydrocarbon gas; and
    a compression system that is coupled to the gas conditioning system, and that includes a first compressor which compresses the hydrocarbon gas processed by the processing unit, and which outputs the compressed hydrocarbon gas at a first pressure level; and
  a second transport including:
    a manifold that receives the hydrocarbon gas at the first pressure level from the first transport, and that has a first output line coupled to a storage compressor and a second output line for outputting hydrocarbon gas from the second transport to an external power generation system, wherein the manifold routes the hydrocarbon gas received from the first transport into multiple flows such that a first portion of the received hydrocarbon gas is directed to the first output line, and a remaining portion of the received hydrocarbon gas is directed to the second output line; and
    a storage tank that stores hydrocarbon gas at a designated storage pressure;
  wherein when the first pressure level of the hydrocarbon gas received at the manifold drops below a predetermined backup pressure, the second transport releases and transfers the hydrocarbon gas from the storage tank to the manifold so that hydrocarbon gas is output from the second output line with at least the predetermined backup pressure.

2. The system according to claim 1, wherein the gas conditioning system and the compression system are disposed on the first transport, and wherein the manifold, the storage compressor, and the storage tank are disposed on the second transport.

3. The system according to claim 2, wherein the first transport and the second transport are separately and independently movable.

4. The system according to claim 1, wherein the compression system of the first transport further includes a dual shaft electric motor and a second compressor, and wherein the dual shaft electric motor drives the first and second compressors.

5. The system according to claim 4, wherein one of the first and second compressors is a reciprocating compressor and the other of the first and second compressors is a screw compressor.

6. The system according to claim 4, wherein the first transport further includes a transformer that transfers electric power to the dual shaft electric motor, and a variable frequency drive to control the electric power to the dual shaft electric motor.

7. The system according to claim 1, wherein the storage compressor is disposed on the second transport, and coupled between the manifold and the storage tank, and
  wherein when the first pressure level of the hydrocarbon gas received at the manifold is at a designated pressure level, the storage compressor compresses and stores the first portion of the received hydrocarbon gas in the storage tank at the designated storage pressure.

8. The system according to claim 1, wherein the second transport further includes:
  a check valve coupled between the storage tank and the manifold, wherein the check valve allows flow of the hydrocarbon gas from the storage tank only in one direction from the storage tank to the manifold; and
  a regulator system coupled between the storage tank and the manifold, wherein the regulator system lowers a pressure of the hydrocarbon gas from the designated storage pressure at the storage tank to the predetermined backup pressure prior to being routed to the second output line of the manifold.

9. The system according to claim 8, wherein the second transport further includes a heater system that is coupled between the storage tank and the manifold and that heats the hydrocarbon gas released from the storage tank prior to being routed to the second output line of the manifold.

10. The system according to claim 1, wherein when the first pressure level of the hydrocarbon gas received at the manifold drops below the predetermined backup pressure, the second transport releases and transfers the hydrocarbon gas from the storage tank to supplement the remaining portion of the received hydrocarbon gas directed to the second output line with the hydrocarbon gas from the storage tank so that the hydrocarbon gas is output from the second output line with at least the predetermined backup pressure.

11. The system according to claim 1, wherein when the first pressure level of the hydrocarbon gas received at the manifold drops below the predetermined backup pressure, the second transport releases and transfers the hydrocarbon gas from the storage tank at the predetermined backup pressure so that an entire flow of the hydrocarbon gas output from the second output line is from the storage tank.

12. The system according to claim 1, wherein when the first pressure level of the hydrocarbon gas received at the manifold is at a designated pressure level: (i) the storage compressor compresses and stores in the storage tank the first portion of the received hydrocarbon gas from the first output line at the designated storage pressure, and (ii) the second transport directs the remaining portion of the received hydrocarbon gas to the second output line without releasing and transferring the hydrocarbon gas from the storage tank, wherein a pressure of the hydrocarbon gas output from the second output line is at least the predetermined backup pressure.

13. A method for processing and storing hydrocarbon gas, comprising:
  receiving hydrocarbon gas from a hydrocarbon fuel source located at a well site or in close proximity to the well site;
  conditioning and compressing the hydrocarbon gas received from the hydrocarbon fuel source;
  receiving, at a transport, the conditioned and compressed hydrocarbon gas at a first pressure level;

diverting, at the transport, a first portion of the received hydrocarbon gas for storage in a storage tank when the first pressure level of the received hydrocarbon gas is at a designated pressure level;

directing, at the transport, a remaining portion of the received hydrocarbon gas to an output line of the transport to power an external power generation system; and releasing and transferring hydrocarbon gas from the storage tank to the output line when the first pressure level of the received hydrocarbon gas drops below a predetermined backup pressure, wherein a pressure of the hydrocarbon gas output from the output line is at least the predetermined backup pressure.

14. The method according to claim 13, further comprising:

compressing, at the transport, the first portion of the received hydrocarbon gas to a designated storage pressure; and storing, in the storage tank at the transport, the compressed first portion of the hydrocarbon gas at the designated storage pressure.

15. The method according to claim 13, wherein releasing and transferring the hydrocarbon gas from the storage tank to the output line when the first pressure level of the received hydrocarbon gas drops below the predetermined backup pressure further comprises:

heating the hydrocarbon gas released and transferred from the storage tank prior to being output to the output line of the transport; and regulating a pressure of the hydrocarbon gas released and transferred from the storage tank from the designated storage pressure to the predetermined backup pressure prior to being output to the output line of the transport.

16. The method according to claim 13, wherein releasing and transferring the hydrocarbon gas from the storage tank to the output line when the first pressure level of the received hydrocarbon gas drops below the predetermined backup pressure further comprises:

supplementing the remaining portion of the hydrocarbon gas directed to the second output line with the released and transferred hydrocarbon gas from the storage tank so that the hydrocarbon gas is output from the output line with at least the predetermined backup pressure.

17. The method according to claim 13, wherein releasing and transferring the hydrocarbon gas from the storage tank to the output line when the first pressure level of the received hydrocarbon gas drops below the predetermined backup pressure further comprises:

releasing and transferring the hydrocarbon gas from the storage tank at the predetermined backup pressure so that an entire flow of the hydrocarbon gas output from the output line is from the storage tank.

18. The method according to claim 13, further comprising, when the first pressure level of the hydrocarbon gas received at the transport is at the designated pressure level:

directing, at the transport, the remaining portion of the received hydrocarbon gas to the output line of the transport to power the external power generation system without releasing and transferring the hydrocarbon gas from the storage tank, wherein the pressure the hydrocarbon gas output from the output line is at least the predetermined backup pressure.

19. A gas compression and storage transport for providing backup hydrocarbon gas to an external power generation system, the transport comprising:

a manifold that receives hydrocarbon gas at a first pressure level from a gas conditioning and compression transport, wherein the manifold has a first output line coupled to a storage compressor and a second output line for outputting hydrocarbon gas from the gas compression and storage transport to the external power generation system, and wherein the manifold routes the received hydrocarbon gas into multiple flows such that a first portion of the received hydrocarbon gas is directed to the first output line, and a remaining portion of the received hydrocarbon gas is directed to the second output line;

a storage tank that stores hydrocarbon gas at a designated storage pressure;

wherein when the first pressure level of the hydrocarbon gas received at the manifold drops below a predetermined backup pressure, the gas compression and storage transport releases and transfers the hydrocarbon gas from the storage tank to the manifold so that hydrocarbon gas is output from the second output line with at least the predetermined backup pressure, and wherein when the first pressure level of the hydrocarbon gas received at the manifold is at a designated pressure level higher than the first pressure level, the gas compression and storage transport directs the remaining portion of the received hydrocarbon gas to the second output line to power the external power generation system without releasing and transferring the hydrocarbon gas from the storage tank, wherein a pressure the hydrocarbon gas output from the second output line is at least the predetermined backup pressure.

20. The gas compression and storage transport according to claim 19, further comprising:

a heater that is coupled between the storage tank and the manifold and that heats the hydrocarbon gas released from the storage tank prior to being routed to the second output line of the manifold;

a regulator coupled between the storage tank and the manifold, wherein the regulator lowers a pressure of the hydrocarbon gas released from the storage tank from the designated storage pressure to the predetermined backup pressure prior to being routed to the second output line of the manifold; and a valve coupled between the storage tank and the manifold, wherein the valve allows flow of the hydrocarbon gas released from the storage tank only in one direction from the storage tank to the manifold.

* * * * *